United States Patent [19]

Jacob et al.

[11] Patent Number: 5,580,313
[45] Date of Patent: Dec. 3, 1996

[54] FIXED CONSTANT VELOCITY JOINT HAVING A PARTIAL SPHERICAL GUIDING ELEMENT

[75] Inventors: Werner Jacob, Frankfurt am Main; Achim Jacob, Kiel, both of Germany

[73] Assignee: Löhr & Bromkamp GmbH, Offenbach am Main, Germany

[21] Appl. No.: 249,873

[22] Filed: May 26, 1994

[30] Foreign Application Priority Data

May 27, 1993 [DE] Germany .............................. 43 17 606

[51] Int. Cl.$^6$ .................................................... F16D 3/224
[52] U.S. Cl. ............................................ 464/145; 464/906
[58] Field of Search ........................... 464/145, 143, 464/139, 178, 906

[56] References Cited

U.S. PATENT DOCUMENTS

| | | | |
|---|---|---|---|
| 4,191,031 | 3/1980 | Girguis et al. | 464/145 |
| 4,504,099 | 3/1985 | Miki et al. | 464/178 X |
| 4,536,038 | 8/1985 | Krude | 464/178 X |
| 4,608,028 | 8/1986 | Welschof et al. | 464/145 |
| 4,610,643 | 9/1986 | Krude | 464/143 |

FOREIGN PATENT DOCUMENTS

| | | |
|---|---|---|
| 3904655C1 | 2/1990 | Germany . |
| 3739867C2 | 3/1990 | Germany . |
| 4208786C1 | 7/1993 | Germany . |
| 948539 | 2/1964 | United Kingdom . |
| 1444894 | 8/1976 | United Kingdom .................. 464/145 |
| 2206394 | 5/1989 | United Kingdom . |
| 2228303 | 8/1990 | United Kingdom . |

*Primary Examiner*—Daniel P. Stodola
*Assistant Examiner*—Emmanuel M. Marcelo
*Attorney, Agent, or Firm*—Harness, Dickey & Pierce

[57] ABSTRACT

A fixed constant velocity joint has an outer part whose inner face includes outer running grooves. The outer part accommodates an inner part with inner running grooves. Each inner running groove and outer running groove jointly accommodate a torque transmitting ball. A cage is arranged at a distance from the inner face of the outer part. The cage is guided on an outer spherical face of the inner part. The inner part includes a first guiding face which guides a guiding element with a second guiding face. The guiding element is radially displaceably guided and axially supported on a contact face. The functional play of the joint is determined by the diameter of the balls. It is possible to set the play in such a way since there is no contact between the outer face of the cage and the inner face of the outer part.

10 Claims, 3 Drawing Sheets

FIXED CONSTANT VELOCITY JOINT HAVING A PARTIAL SPHERICAL GUIDING ELEMENT

BACKGROUND OF THE INVENTION

The present invention relates to a fixed constant velocity joint with a hollow outer part whose inner face, in meridian planes with reference to the longitudinal axis of the outer part, includes outer running grooves. The joint has an inner part which is arranged in the cavity of the outer part and whose outer face, in meridian planes with reference to the longitudinal axis of the inner part includes inner running grooves which are arranged opposite the outer running grooves. The opposed inner running grooves and outer running grooves, for torque transmitting purposes, jointly accommodating a ball which is guided in windows of a cage arranged in the space between the inner face of the outer part and the outer face of the inner part. The inner running grooves and the outer running grooves are jaw-like and undercut-free starting from the end which is closed in the assembled condition of the joint. The cage, via a hollow spherical partial face, is guided on an outer spherical face of the inner part, which faces away from the closed end. Further, the joint has guiding means including a first spherical guiding face at the inner part and a corresponding second guiding face of a guiding element which is held on a supporting element supported on the outer part.

DE 37 39 867 C2, published Mar. 8, 1990, discloses the entire outer face of the inner part designed as a spherical face which serves to rest against a spherical cup. The cup is produced as a separate part and separated from the outer part.

The joint components cooperating in the radial direction, the inner part, cage and outer part are centered by a suitable spherical face of the inner part which cooperates with a hollow spherical partial face of the cage. Also, the spherical outer cage face which is guided on a hollow spherical partial face of the outer part. The disadvantage of such an embodiment is that it is necessary to adjust two sate of centering means relative to one another which have a centering function in the radial direction. On the one hand, centering is effected by the outer spherical face of the inner part relative to the separate supporting element. On the other hand, it is necessary to center the cooperating spherical and hollow spherical faces of the inner part, cage and and outer part. The outer spherical face of the inner part extends over more than 180° and requires subsequent machining because if the outer spherical face is to be accurately produced to its final dimensions only by precision forming, it is necessary to use sophisticated, expensive equipment.

SUMMARY OF THE INVENTION

It is an object of the invention to provide a fixed constant velocity joint where identical conditions regarding guidance of the joint parts in the radial direction do not exit. Also, it is an object to easily adjust play in the joint.

In accordance with the invention, the objective is achieved by arranging the centers of the two guiding faces in the center of the outer spherical face of the inner part. The cage, via its outer face, is herd at a distance from the inner face of the outer part. The cage, the inner part and the guiding element are held entirely by the balls in the outer running grooves and the inner running grooves to radially and axially center them relative to the outer part and axially relative to the supporting element fixedly supported thereon against an axial stop. In the assembled condition of the joint, the guiding element, via a stop face, is radially adjustably supported on a guiding face of the supporting element. The guiding face, at right angles, intersects the longitudinal axis of the outer part. Also, the diameter of the balls is adapted to the functional play required for the functioning of the joint.

An advantage of such an embodiment is that the unit including the inner part, cage and guiding element, is able to adjust itself freely in the radial direction relative to the longitudinal axis of the outer part and relative to the supporting element in respect of the necessary axial play so that identical conditions with respect to the guidance of the joint components relative to one another do not exist. To achieve the required behavior of the joint in the assembled condition, the joint is adjusted relative to its functional play merely by selecting the diameter of the balls.

The invention can be applied only to those joints where the cage and the inner part are held and centered in the inner and outer running grooves relative to the outer part by the balls and only where there is a gap between the outer face of the cage and the inner face of the outer part. It is these features which enable axial adjustment of the unit relative to the outer joint part. As far as the control assembly is concerned, such a joint type is described in DE 39 04 655 C1, published Feb. 8, 1990, where only the balls hold the cage relative to the inner joint part. Furthermore, the balls center the inner joint part and cage relative to the outer joint part. It is thus possible to obtain a particularly low friction joint which is further helped by the supporting element, because of its radially floating arrangement, not exerting any forces on the centering means.

In a first embodiment, the inner part is provided with a hollow spherical partial face constituting the first guiding face. The guiding element is provided with a matching spherical cap constituting the second guiding face. In a further possibility, the inner part is provided with an outer spherical face constituting the first guiding face. The guiding element is provided with a matching spherical cup constituting the second guiding face.

In a third embodiment, the inner part includes a hollow spherical partial face constituting the first guiding face, with a divided guiding element. The guiding element includes a part with the contact face and a seat face and a ball adapted to the guiding face and the seat face. The ball is received in the seat face.

In a preferred embodiment, the first guiding face is designed as a hollow spherical partial face and is undercut-free, starting from the closed end of the assembled joint.

An advantage of such an embodiment is to select a standard part commonly used in rolling contact bearings and is available in very fine diameter graduations. Such an embodiment includes a surface which otherwise can only be achieved at great expense for a one-part supporting element. The friction conditions are thus also advantageously affected by such a design.

To achieve low-friction conditions, in a further embodiment of the invention, the first guiding face is a hollow spherical zone. The hollow spherical zone is formed by two parallel planes intersecting the hollow sphere. To achieve a particularly advantageous friction behavior and thus low losses, the two intersecting planes, according to the teaching of the invention, are arranged on one side on one half of a hollow sphere. There is thus obtained a larger and a smaller face of an imaginary hollow spherical layer. The spherical section associated with the larger face and thus with the larger opening of the hollow spherical layer, with reference to the center, has an apex angle of less than 166°.

As far as the smaller face and thus smaller opening of the hollow spherical layer is concerned, the associated hollow spherical section, with reference to the center, has an apex angle of 14°.

As the design principles are such that it is easy to set the play values, in a further embodiment, the outer part is in the form of a formed plate metal part. In this way, even an outer part produced with rougher tolerances may be used to ensure closer play conditions in the joint.

Furthermore, the supporting element is in the form of a formed plate metal part. Also, the supporting element has a kind of flange which rests against and is secured to a flange of the outer part, which forms an axial stop.

The supporting element may also include a formed solid part with a flange portion whose outer contour corresponds to the inner face of the outer part. Furthermore, the supporting element includes a formed-on journal to establish a non-rotatable connection with a driving part or a part to be driven. The outer part, too, may be a formed solid part.

From the following detailed description taken in conjunction with the accompanying drawings and subjoined claims, other objects and advantages of the present invention will become apparent to those skilled in the art.

BRIEF DESCRIPTION OF THE DRAWINGS

Several embodiments of a fixed constant velocity joint in accordance with the invention are illustrated in the drawing wherein.

DETAILED DESCRIPTION OF THE PREFERRED EMBODIMENTS

Figure 1:
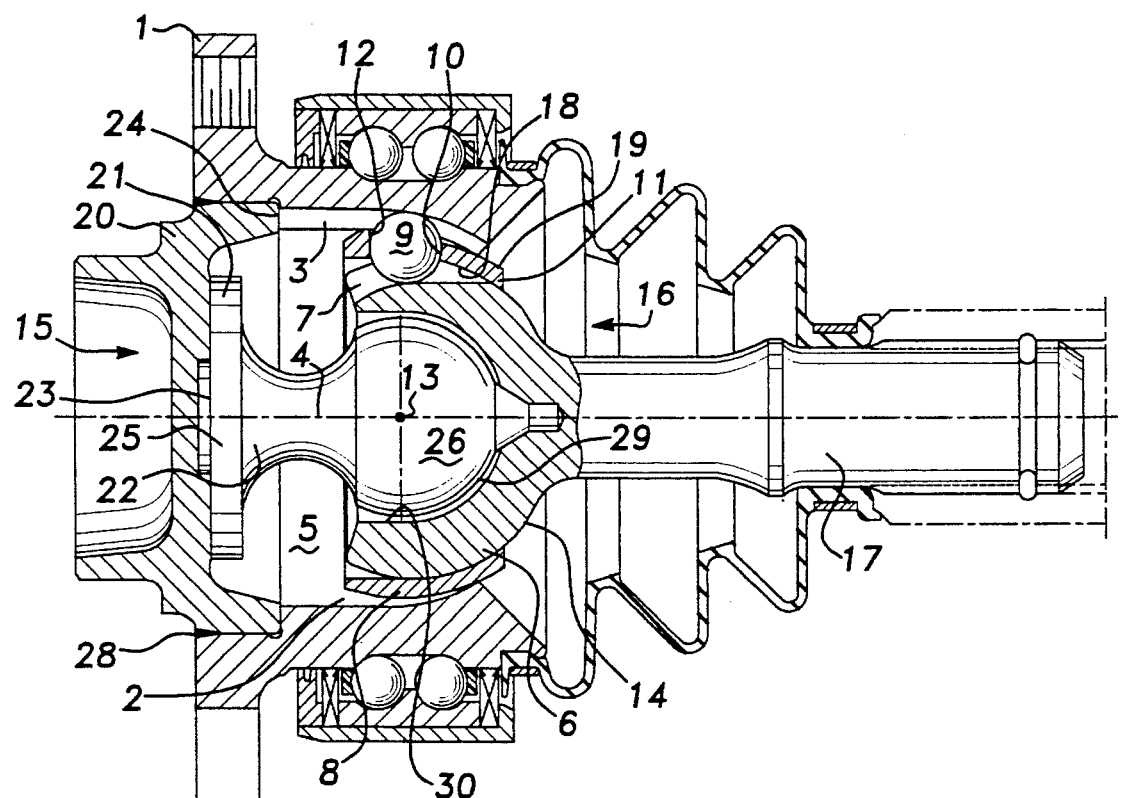
FIG. 1 is a longitudinal sectional view through a fixed constant velocity joint in accordance with the invention.

The first embodiment of a fixed constant velocity joint in accordance with the invention is illustrated in FIG. 1. The joint includes an outer part 1 which is a solid part whose inner face 2 includes circumferentially distributed formed-in outer running grooves 3. The outer running grooves 3 are circumferentially distributed in meridian planes with reference to the longitudinal axis 4 of the outer part. The hollow inner cavity 5 of the outer part 1 accommodates the inner part 6.

The outer face 8 of the inner part 6 includes inner running grooves 7 which are circumferentially distributed to correspond to the outer running grooves 3, with two opposed running grooves, an outer running groove 3 and an inner running groove 7, jointly accommodating a torque transmitting ball 9. The balls 9 are guided in windows 10 of a cage 11 such that they are held in the angle bisecting plane through the joint articulation center 13. The bisecting plane is the plane which halves the angle between the longitudinal axis 4 of the outer part and the longitudinal axis 4 of the inner part when the joint is in the articulated condition. As a result of the shape of the outer running grooves 3 and the inner running grooves 7, the balls 9 are held towards the window face 12. This applies to all rotational angles and conditions of articulation of the outer part 1 relative to the inner part 6.

The inner part 6, on its outer face 8, has an outer spherical face 14 which faces away from the closed end 15 of the assembled fixed constant velocity joint. The spherical face 14 adjoins the open end 16 of the outer part 1. The inner part 6 of the journal 17 projects from the open end 16. The outer spherical face 14 is also centered on the center 13.

The cage 11 is provided with a hollow spherical partial face 18 by which it is guided on the outer spherical face 14 of the inner part 6. The outer face 19 of the cage 11 is arranged to leave a gap between it and the inner face 2 of the outer part 1. The cage 11 does not contact the outer part 1. The hollow spherical face 18 of the cage 11 is held in contact with the outer face 14 as a result of the balls 9 stopping against the window faces 12. Since the outer running grooves 3 and the inner running grooves 7 are undercut-free and jaw-like, starting from the closed end 15 of the joint, and with reference to the balls 9, they form a control angle. As a result of the control angle, under torque transmitting conditions, a force is applied to the balls 9 in all rotational and angular positions of the outer part 1 relative to the inner part 6. The force holds the balls 9 in contact with the window faces 12 of the cage windows 10 arranged towards the closed end 15.

In consequence, there is no friction between the cage 11 and the inner face 2 of the outer part 1. As the cage 11 is guided by its hollow spherical partial face 18 on the outer spherical face 14 of the inner part 6, its center 13 is also centered on the center 13. The hollow spherical partial face 18 of the cage 11 also ends in front of the angle-bisecting plane, for example the plane illustrated by the dash-dotted line extending vertically relative to the longitudinal axis 4 of the outer part and through the centers of the balls 9.

A supporting element 20 is axially inserted into the cavity 5 of the outer part 1. The supporting element 20 is a formed solid part and includes a guiding face 21 which extends radially with reference to the longitudinal axis 4 of the outer part and arranged at a fixed distance from an axial stop 24 of the outer part 1.

The guiding element 22, via its contact face 23, is axially supported on the guiding face 21 in the direction of the longitudinal axis 4 of the outer part. The contact face 23 forms part of a base 25 which is followed by a partial sphere 26. The partial sphere 26 is positioned in a seat face 27. The seat face which is designed as a hollow spherical partial face and its center is also centered on the center 13. The second guiding face 29 is formed by the partial sphere 26. The first guiding face 30 is formed by a corresponding hollow spherical face of the seat face 27. A weld 28 connects the supporting element 20 to the outer part 1. The outside of the outer part 1 includes running grooves for a double-row ball bearing. The outer part 1 also includes a flange which serves as a wheel flange.

By selecting a suitable diameter for the balls 9, it is possible, both in the axial direction, in the direction of the longitudinal axis 4 of the outer part, and in the radial direction, to set the play between the unit including the inner part 6, the guiding element 22 and the cage 11, on the one hand, and the outer part 1, on the other hand, in such a way as to observe the functional play required for accurate functioning of the joint. The smaller the ball 9, the longer the distance the unit is displaced to the right towards the open end 16. The larger the balls, the longer the distance the unit is displaced to the left towards the closed end 15.

Figure 2:
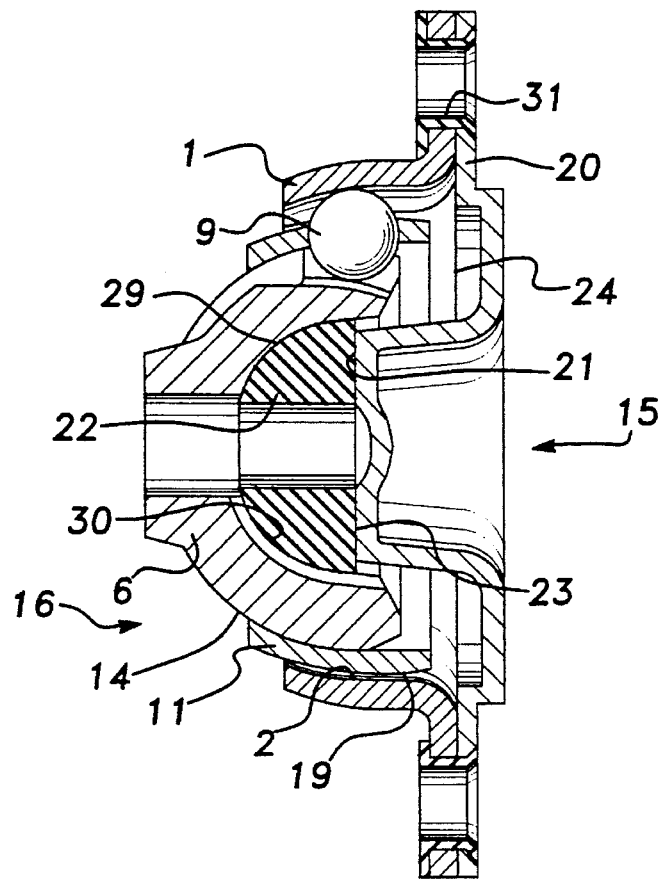
FIG. 2 is a longitudinal sectional view through a further embodiment of a fixed constant velocity joint.

FIG. 2 shows a fixed joint whose outer part 1 is a formed plate metal part. The outer part 1 includes an outwardly extending flange whose face, pointing towards the closed end 15, serves as an axial stop 24 for the supporting element 20. The supporting element 20 is drawn in towards the open end 16 and forms the guiding face 21 which, via the contact face 23, radially movably supports the guiding element 22 shaped like a semi-spherical disc. Via a first guiding face 30, the guiding element 22 engages the second guiding face 29 of the inner part 6, which may be designed as a hollow spherical partial face. Again, the play is set by making use of the size of the balls 9. The cage 11 is only guided on the outer spherical face 14 of the inner part 6 and there is no contact between the outer face 19 of the cage 11 and the inner face 2 of the outer part 1. Since there is no contact, it is possible, when setting the play via different selectable diameters of the balls 9, to axially adjust the unit including the inner part 6, the guiding element 22 and the cage 11 relative to the supporting element 20 secured to the outer part 1 and its guiding face 21. The supporting element 20 is secured to the flange of the outer part 1 by means of an externally beaded fixing sleeve 31 inserted into a bore.

Figure 3:
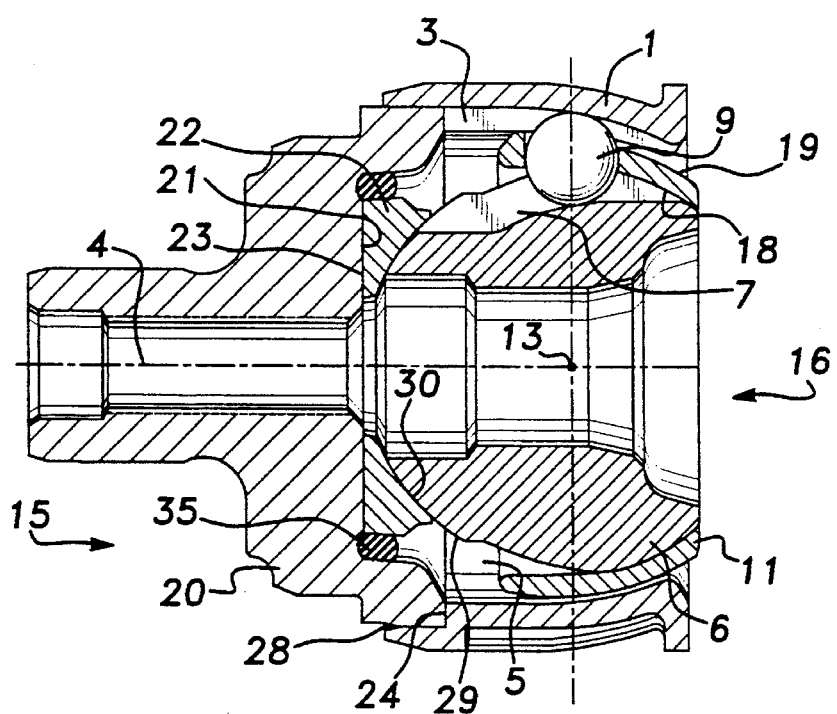
FIG. 3 is a longitudinal sectional view through another embodiment of the invention.

FIG. 3 shows a fixed constant velocity joint where the outer part 1 is a formed plate metal part, whereas the supporting element 20 is a formed solid part whose outer contour is provided with projections which non-rotatably engage the outer running grooves 3 of the outer part 1. The supporting element 20 rests against the axial stop 24 of the outer part 1 in an axially fixed way and is securely connected to the outer part 1 by a weld 28. The guiding element 22 includes a contact face 23 which radially movably contacts the guiding face 21 which extends radially relative to the longitudinal axis 4 of the outer part. The guiding member 22 is retained in place during assembly by ring 35. The ring 35 is made of a deformable or resilient material. Thus, the ring 35 does not influence the radial movement of the guiding element 22.

The inner part 6 includes an outer spherical face 14 which rests against a hollow spherical partial face 18 of the cage 11. As a result of the shape of the outer running grooves 3 and the inner running grooves 7, the cage 11 is moved to the left and held in contact with the outer spherical face 14. The center 13 constitutes the center of both the outer spherical face 14 and of the hollow spherical partial face 18 of the cage 11. Towards the closed end 15 of the joint, the inner part 6 includes a second guiding face 29. The second guiding face 29 is a part-spherical outer face and is supported in the first guiding face 30 of the spherical cup shaped guiding element 22. To achieve the correct play values both in the axial direction, between the guiding element 22 or its contact face 23 and the guiding face 21 of the supporting element 20, and in the radial direction different diameters balls are used. The balls 9 are selected to suit the magnitude of the play required to ensure accurate functioning of the joint.

Figure 4:
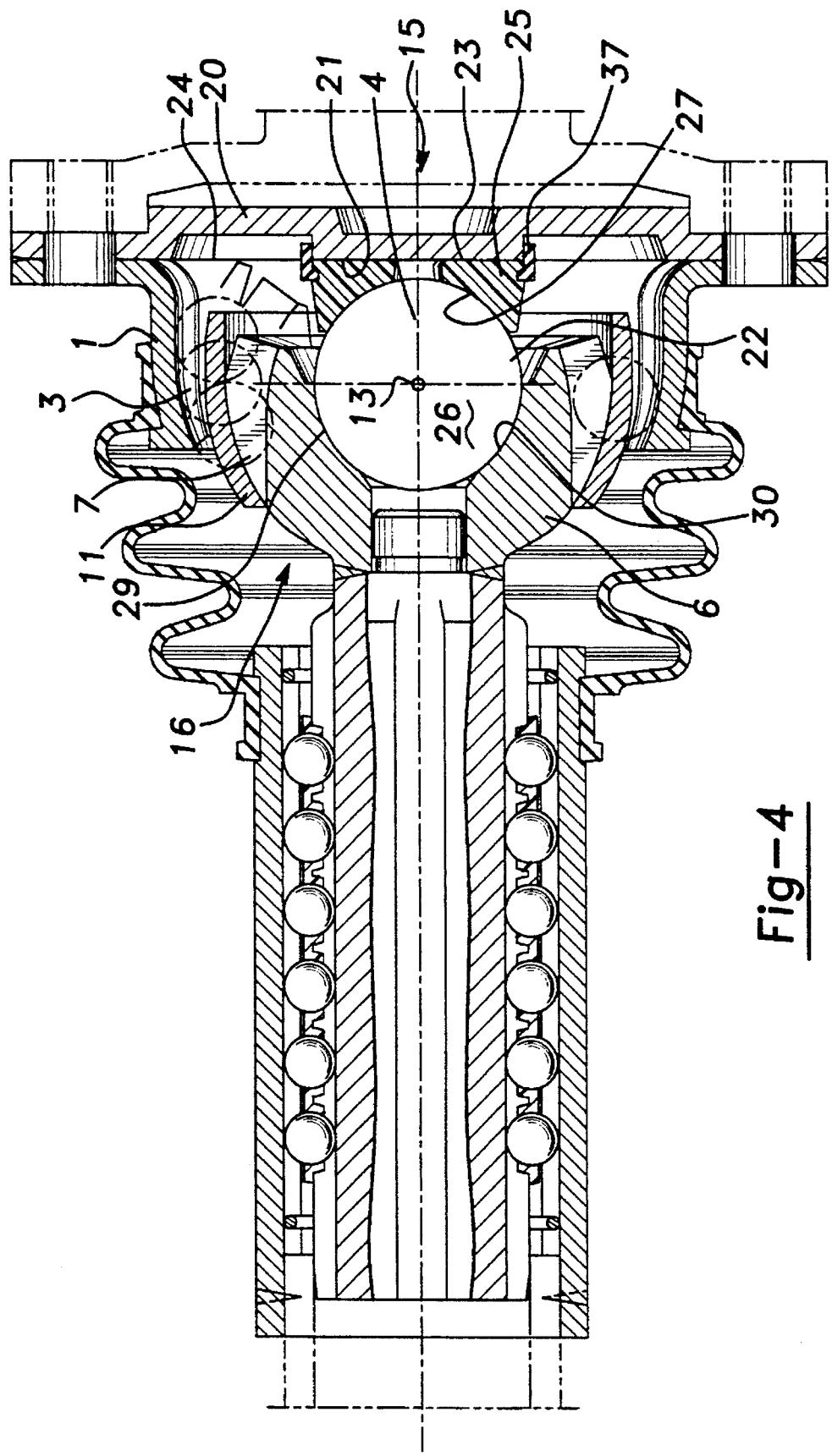
FIG. 4 is a longitudinal sectional view through a fixed constant velocity joint for smaller articulation angles.

FIG. 4 shows a fixed joint whose outer part 1 again is a formed plate metal part. The same applies to the supporting element 20. The supporting element 20 axially rests against the axial stop 24 formed by the outwardly directed flange-like enlargement of the outer part 1. The guiding element 22, by means of its contact face 23, rests against the guiding face 21 of the supporting element 20. The guiding element 22 is divided into two parts. It includes a supporting base 25 with a spherical cup constituting the seat face 27. The seat face 27 is engaged by a sphere 26 whose outer face forms the second guiding face 29 and rests against the first guiding face 30 of the inner part 6. The base 25 is retained in place by a ring 37. The ring 37 is made of a deformable or resilient material.

Thus, the ring 37 does not influence the radial movement of the guiding element. The first guiding face 30 is designed as a hollow spherical partial face. The joint illustrated is intended for smaller articulation angles and, for example, includes plunging means which are intended to receive axial movements and which are connected to the inner part 6.

While the above detailed description describes the preferred embodiment of the present invention, the invention is susceptible to modification, variation, and alteration without deviating from the scope and fair meaning of the subjoined claims.

We claim:

1. A fixed constant velocity joint comprising:

a hollow outer part with an inner face having outer running grooves in meridian planes with reference to a longitudinal axis of said outer part;

an inner part arranged in a cavity of said outer part, an outer face of said inner part including inner running grooves in meridian planes with reference to a longitudinal axis of said inner part, said inner running grooves are arranged opposite said outer part outer running grooves, said opposed inner running grooves and outer running grooves, for torque transmitting purposes, jointly accommodating a ball which is guided in windows of a cage arranged in a space between the inner face of the outer part and the outer face of the inner part;

said cage including a hollow spherical partial face, said face being guided on an outer spherical face of the inner part, said outer spherical face facing away from a closed end of said hollow outer part;

guiding means for accommodating movement between said inner and outer parts, said guiding means including a first spherical guiding face on said inner part and a corresponding second guiding face on a guiding element held on a supporting element supported on the outer part; and centers of said two guiding faces are arranged at a center of the outer spherical face of the inner part, said cage including an outer face which is held at a distance from the inner face of the outer part, said cage, inner part and guiding element are held entirely by the balls in outer running grooves and the inner running grooves so as to be radially and axially centered relative to the outer part and axially relative to the supporting element fixedly supported thereon against an axial stop, and in an assembled condition of the joint, the guiding element is radially adjustably supported on a guiding face of the supporting element, which supporting element guiding face, at right angles, intersects the longitudinal axis of the outer part.

2. The fixed constant velocity joint according to claim 1, wherein said inner part includes a hollow spherical partial face constituting the first guiding face and said guiding element includes a matching spherical cap constituting the second guiding face.

3. The fixed constant velocity joint according to claim 2, wherein said first guiding face is undercut-free, starting from the closed end of the assembled joint.

4. The fixed constant velocity joint according to claim 1, wherein said inner part includes an outer spherical face constituting the first guiding face and said guiding element includes a matching inner spherical face constituting the second guiding face.

5. The fixed constant velocity joint according to claim 1, wherein said inner part includes a hollow spherical partial face constituting the first guiding face and said guiding element includes a part with the stop face and a supporting face and a sphere adapted to the guiding face and to a seat face.

6. The fixed constant velocity joint according to claim 1, wherein said first guiding face is shaped like a hollow spherical zone.

7. The fixed constant velocity joint according to claim 1, wherein the outer part is a formed plate metal part.

8. The fixed constant velocity joint according to claim 1, wherein said supporting element is a formed plate metal part and is secured to the flange of the outer part said supporting element constituting an axial stop.

9. The fixed constant velocity joint according to claim 1, wherein the supporting element is adapted to be connected to one of a driving part and a part to be driven.

10. The fixed constant velocity joint according to claim 1, wherein said supporting element is a formed solid part having a flange including an outer contour corresponding to the inner face of the outer part, and further including a formed-on journal.

* * * * *

UNITED STATES PATENT AND TRADEMARK OFFICE
CERTIFICATE OF CORRECTION

PATENT NO. : 5,580,313

DATED : December 3, 1996

INVENTOR(S) : Werner Jacob, Achim Jacob

It is certified that error appears in the above-indentified patent and that said Letters Patent is hereby corrected as shown below:

In the Abstract, please insert the following sentence at the end of the Abstract:
--The method in accordance with the invention thus constitutes an easy way of setting the functional play required for the functioning of the joint.--

Column 1, line 41, "sate" should be --sets--

Column 1, line 47, delete "and" (second occurrence)

Column 1, line 58, "exit" should be --exist--

Column 1, line 63, "herd" should be --held--

Signed and Sealed this

Twentieth Day of May, 1997

*Attest:*

BRUCE LEHMAN

*Attesting Officer*       *Commissioner of Patents and Trademarks*